United States Patent
Trac et al.

(10) Patent No.: US 7,480,240 B2
(45) Date of Patent: Jan. 20, 2009

(54) SERVICE CURVE MAPPING

(75) Inventors: Lap Nathan Trac, San Jose, CA (US); Steven McCanne, Berkeley, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 11/756,584

(22) Filed: May 31, 2007

(65) Prior Publication Data

US 2007/0297348 A1  Dec. 27, 2007

Related U.S. Application Data

(60) Provisional application No. 60/810,029, filed on May 31, 2006.

(51) Int. Cl.
*H04L 12/26* (2006.01)
(52) U.S. Cl. ............................... 370/230.1; 370/395.21; 370/395.43
(58) Field of Classification Search ................ None
See application file for complete search history.

(56) References Cited

U.S. PATENT DOCUMENTS

| | | | |
|---|---|---|---|
| 6,973,033 B1 * | 12/2005 | Chiu et al. | 370/230.1 |
| 7,010,611 B1 * | 3/2006 | Wiryaman et al. | 709/232 |
| 7,068,660 B2 * | 6/2006 | Suni | 370/395.2 |
| 7,075,934 B2 * | 7/2006 | Chiussi et al. | 370/395.41 |
| 7,120,666 B2 | 10/2006 | McCanne et al. | |
| 7,146,425 B2 * | 12/2006 | Ottamakorn et al. | 709/235 |
| 2004/0215746 A1 | 10/2004 | McCanne et al. | |
| 2007/0237074 A1 | 10/2007 | Curry | |
| 2007/0297414 A1 | 12/2007 | Gupta et al. | |

OTHER PUBLICATIONS

U.S. Appl. No. 12/210,087, filed Sep. 12, 2008, Lap Trac.
International Search Report and Written Opinion mailed Jul. 7, 2008 of PCT/US07/70158 filed May 31, 2007.
International Search Report and Written Opinion mailed Sep. 22, 2008 of PCT/US07/71254 filed Jun. 14, 2007.
U.S. Appl. No. 11/762,688, filed Jun. 13, 2007, Office Action mailed Apr. 1, 2008.
U.S. Appl. No. 11/762,688, filed Jun. 13, 2007, Response to Office Action received by the USPTO on Aug. 1, 2008.
Balakrishnan, S., et al., "Improving reliable transport and handoff performance in cellular wireless networks," *Wireless Networks*, vol. 1. No. 4, Dec. 1995. pp. 469-481.
Bennet and Zhang, "Hierarchical Packet Fair Queuing Algorithms", Proc. ACM SIGCOMM 1996.

(Continued)

*Primary Examiner*—Wing F Chan
*Assistant Examiner*—Brian Roberts
(74) *Attorney, Agent, or Firm*—Townsend and Townsend and Crew LLP

(57) ABSTRACT

A method for configuring service curves for managing the output port of a networking device includes the following steps. A multitude of traffic classes is defined, each traffic class being characterized by a bandwidth and a delay priority. A multitude of traffic service curves is computed, each of the plurality of traffic service curves is associated with a different one of the multitude of traffic classes. At least one of the multitude of traffic classes service curves is characterized by a shifted two-piece linear function shifted such that the service curve limits service to during a nonzero time period prior to the start of the two-piece linear function.

23 Claims, 10 Drawing Sheets

OTHER PUBLICATIONS

Cruz, R. L., "Service burstiness and dynamic burstiness measures: a framework", Journal of High Speed Networks, vol. 1, No. 2, 1992.

Floyd, S. and V. Jacobson, Link-Sharing and Resource Management Models for Packet Networks, IEEE/ACM Transactions on Networking, vol. 3, No. 4, Aug. 1995.

Salter, J. H., et al., "End-to-End Arguments in System Design," *ACM Transactions on Computer Systems*, vol. 2, No. 4, Nov. 1984, pp. 277-288.

Sariowan, H., R. Cruz, and G. Polyzos "Scheduling for Quality of Service Guarantees via Service Curves", Proc. ICCCN Sep. 1995.

Stoica, I., H. Zhang, and T. S. E. NG in an article entitled "A Hierarchical Fair Service Curve Algorithm for Link-Sharing, Real-Time and Priority Service", Proc. ACM SIGCOMM, 1997, Cannes, France.

* cited by examiner

```
update_ed (i, p, next_p){
  if (not active(i)) {
      ct = current_time;
      update_DC(i, ct);
      update_EC(i, ct);
  }
  if (p! = null)
      c_i = c_i + length(p);
  d_i = D_i^{-1}(·; c_i + length(next_p)) + U_i
  e_i = E_i^{-1}(·; c_i)
} update_d(i, p, next_p){
  d_i = D_i^{-1}(·; c_i - length(p) + length(next_p)) + U_i
}
```

Input:
R – The link rate

N – The number of traffic classes

M – The number of delay priority categories $B_1...B_N$ where $B_k$ is the bandwidth guarantee of class k and $\sum_k B_k \leq R$ $P_1...P_N$ where $P_k$ is the delay priority category of class k and $P_k \in \{1...\} \; \forall k$ $T_1...T_M$ where $T_k$ is the burst size (in seconds) of delay priority category k.

Output: $x1_k, m1_k, m2_k, x2_k$

Algorithm: Let $\Delta_1 = 0$, $\Delta_k = \sum_{j=1}^{k} T_j$ for $k = 2...M$

Let $S_k \triangleq \{C : P_C = k\}$, which is the set of all classes whose priority category is k.

Let $A_1 = 1$, $A_k = \sum_{j < k} \sum_{i \in S_j} B_i$

Then, $X1_k = \Delta P_k$, $X2_k = \Delta P_{(k+1)}$, $m1_k = \dfrac{R - Ap_k}{|Sp_k|}$, $m2_k = B_k$

*FIG. 13*

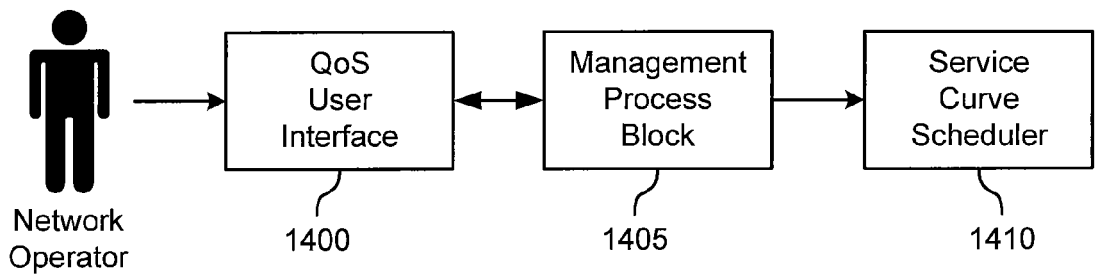

*FIG. 14*

SERVICE CURVE MAPPING

CROSS-REFERENCE TO RELATED APPLICATIONS

The present application claims benefit under 35 USC 119 (e) of U.S. provisional application No. 60/810,029, filed May 31, 2006, entitled "Service Curve Mapping", the content of which is incorporated herein by reference in its entirety.

BACKGROUND OF THE INVENTION

The present invention relates to quality of service (QoS) in a computer network, such as those complying with the Internet Protocol (IP).

Routers, switches, and other devices have output ports that interface equipment to a packet network. Examples of output ports include network interface cards (NICs), line cards, links, network interfaces, etc. An output port's packet rate is the rate at which it receives packets from the equipment or when packets otherwise become ready to transport. An output port's link rate is the rate at which it can send the packets into the network, typically related to available bandwidth.

When the packet rate exceeds the link rate, the output port must either discard packets, store packets temporarily in a memory, or perform a combination of these functions. The data structure used to hold packets temporarily may be a queue, but may be more elaborate.

In one conventional technique, when a packet becomes ready to be sent on an output port, it is inserted into that port's queue and each time the port is available to send a new packet, a packet is taken from the queue and transmitted out. If the output port drops packets, a higher-level protocol can deal with recovery from the drop, using FEC, retransmission or other approaches. This may lead to delays for the data in those packets.

An output port is not limited in scope to a physical layer device such as a T-1 interface card or a SONET interface. More generally, a port can be a transmission engine that sends packets according to a bandwidth shaping rule, where the bandwidth may be fixed or may vary with time. For example, an output port may correspond to a virtual private network (VPN) tunnel where network traffic is groomed to a specified transmission rate over that tunnel, or the port may correspond to a rate-limited transmission of network traffic over a higher-capacity physical interface, e.g., an interface that sends packets at 1.5 Mb/s over a 1 Gb/s Ethernet connection coupled to a router that is, in turn, coupled to a T1 connection. Thus, the network traffic is groomed to 1.5 Mb/s in a device that has a 1 Gb/s network interface so that those packets in turn can be transmitted smoothly over a slower speed link.

FIG. 1 is a block diagram of a number of devices forming a network 10. Rate-shaping device 22 is disposed between a set of clients and/or servers 12 on a local area network (LAN) and a wide area network (WAN) router 24. Rate-shaping device 22 grooms the network traffic to a profile that moves the congestion point from WAN router 24 to rate-shaping device 22. Since the traffic is groomed to fit WAN router 24, no queue builds up on WAN router 24, and QoS mechanisms can be effectively implemented at rate-shaping device 22.

The rate-shaping function may be implemented within any device that processes network packets, whether the device operates at the link layer (e.g., a LAN switch, bridge, etc.), at the network layer (e.g., a router, VPN device, NAT, a WAN packet compressor, etc.), at the transport layer (e.g., a layer-4 switch, a transparent TCP proxy, etc.), at the application layer (e.g., a Web proxy, a file cache, an application accelerator, etc.), or any combination thereof. Throughout this disclosure, the term "networking device" is used to refer to any device that performs any combination of functions at any layer in the protocol stack by sending packets to or receiving packets from a network interface port. In general, the term "link rate" refers interchangeably herein either to a physical interface rate or to the rate defined by bandwidth shaping rules associated with a virtual port or the like.

An important consequence of the queuing behavior of IP networks is that packets must spend time waiting in the queues of networking devices. This waiting time, often called the queuing time or queuing delay, may degrade the performance of higher layer protocols and applications that utilize the network path through such devices. Moreover, when the packet rate on a given output port exceeds the port's link capacity for a sustained period of time—a phenomenon called network "congestion"—the queue for that output port continues to grow and, at some point, the networking device will have to discard some packets. There is a delicate tradeoff in how such decisions are made, because if the queue is allowed to grow very large, then the queuing delays become large and adversely impacts performance. Conversely, if the queue is limited to be very small, then the networking device is not able to absorb bursts of traffic and may drop packets too frequently, likewise causing an adverse impact on performance. Sometimes packets are marked to indicate congestion (using explicit congestion notification, or ECN) rather than being dropped to signal to the end points to lower their transmission rates.

The above problems with IP networks are known and a number of techniques have been developed t to manage the manner in which queuing delays manifest themselves and that determine how and which packets should be dropped in the event of congestion. While queuing delays in an IP network cannot be completely eliminated, they can be managed such that the more important or delay sensitive applications receive preferential service over less important traffic, and when congestion occurs less important packets can be dropped before the more important ones.

In general, the problem of providing differing levels of quality of service (QoS) to network traffic is decomposed into traffic classification, queue management, and scheduling algorithms. Traffic classification entails assigning each packet to a class, which is typically specified by a network operator. For example, a class might be voice traffic, or file server traffic, or Web traffic between the New York and Orlando offices, etc. Typically, each class is assigned to a particular queue. More than one class may be assigned to the same queue, causing traffic from those multiple classes to be treated as a single aggregate. When different flows or collections of application sessions are aggregated in this fashion, the resulting scheme is often called Class of Service (CoS) resource management rather than QoS to emphasize the notion that network traffic is managed in a coarser grained fashion.

Queue management entails how a queue is maintained as packets are inserted and removed from the queue and which packets are dropped when the queue becomes full, or begins to become full, in the event of congestion. A first-in, first-out (FIFO) queue with a drop-tail drop policy is a simple example of a queue management scheme. More elaborate schemes such as random early detection (RED), weighted random early detection (WRED), fair queuing (FQ), weighted fair queuing (WFQ), deficit round-robin (DRR), etc., have been developed. In a common configuration, a networking device manages multiple queues for each output port. Packets are placed in the different queues according to policy that is controlled by traffic classification.

When there are multiple queues on a given port, a scheduling algorithm determines how and what queues are serviced each time there is an opportunity to transmit a packet over the output port. A scheduling algorithm is typically represented by a program code, circuit logic, or a combination, that when executed or operated by processing equipment or devices performs a process detailed by steps of the scheduling algorithm.

One of the simpler scheduling algorithms is a static-priority scheduler. In this algorithm, each queue is assigned a priority, and at each service time, the non-empty queue with the highest priority is chosen to be serviced. Another example is WFQ. While WFQ can be realized as a queue management scheme, the WFQ algorithm can also be deployed as a scheduler. For example, a collection of FIFO queues might be serviced according to a WFQ schedule, a collection of RED queues might be serviced according to a DRR schedule, or a collection of WFQ queues might be serviced according to a WFQ scheduler. This latter approach is sometimes called "hierarchical packet fair queuing" (H-PFQ), described in Bennet and Zhang, "Hierarchical Packet Fair Queuing Algorithms", Proc. ACM SICOMM 1996.

A key problem with known scheduling and queue management algorithms is that the amount of queuing delay a flow or class experiences is related to the bandwidth or rate that is allocated to that flow. For example, in class-based WFQ, weights are assigned to each class and the link bandwidth is divided among the different classes in proportion to the weight assignment. To achieve a lower average delay for a class, the weight must be increased, which results in an increase in the rate allocated to that class. In other words, the only way to increase a class' delay priority in WFQ is to allocate a greater amount of bandwidth to that traffic class. As such, priority and bandwidth are intrinsically coupled together and are thus controlled by a single parameter. A QoS policy for traffic underlying a remote terminal application, which requires high priority but only needs moderate bandwidth, cannot be efficiently achieved. Either an excessive amount of bandwidth must be allocated or the traffic's priority must be sacrificed.

An important scheme for overcoming this undesirable coupling of delay and bandwidth management employs the use of service curves, formalized by R. L. Cruz, "Service business and dynamic burstiness measures: a framework", Journal of High Speed Networks, Vol. 1, No. 2, 1992. A service curve defines how much network service is guaranteed to be allocated to a given network flow or traffic class at any given point in time, expressed as bits serviced versus time, presuming the flow or traffic class is active, i.e., has packets queued and ready to send. For example, FIG. 2 depicts a service curve (200) that is a straight line with slope m. A scheduler that guarantees this service curve to a network flow or class would service packets from that flow or class frequently enough to ensure a service of at least m bits per second.

In a publication entitled "Scheduling for Quality of Service Guarantees via Service Curves", Proc. ICCCN September 1995, authors H. Sariowan, R. Cruz, and G. Polyzos proposed a specific scheduling policy called "Service Curve-based Earliest Deadline first" (SCED). While SCED represented a scheduling policy using service curves, the problem of developing a scheduling algorithm that efficiently implements guarantees for arbitrary service curves was not solved.

Generally speaking, a scheduler that is configured with service curves and can schedule traffic to adhere to the service curve specifications is called a service curve scheduler, and the guarantee of service provided to each class is called the service curve guarantee. Such a guarantee can be met by providing service in excess of the service curve requirement, and in general, when a service curve scheduler has additional available bandwidth after all guarantees are met, it can distribute that excess bandwidth in a deliberate and controlled fashion. The actual service received by a class can be any non-decreasing function of time that is equal to or greater than the service curve for all times.

A scenario where the service curve of each traffic class or flow has the form of a straight line through the origin is equivalent to WFQ where the WFQ weights are defined by the slopes of the service curve. However, even with a service curve model, such a configuration suffers from the undesirable coupling of delay and bandwidth. To decouple priority and bandwidth, the service curve must have additional degrees of freedom. For example, a two-piece, linear service curve can be employed to decouple bandwidth and delay. As shown in FIG. 3, a two-piece curve has a first slope, m1, and an x-offset, x, used to determine the traffic class' delay priority, and a second slope, m2, used to determine the long-term bandwidth allocation. This allows traffic patterns such as interactive sessions that have different priority and bandwidth allocation requirements to be efficiently represented within a single curve. In this scenario, a traffic class is allowed to burst at a relatively higher rate of m1, thereby optimizing delay, for a certain period of time x. But after that time, the scheduler throttles the rate of the class down to a lower rate of m2, which can be independent of the priority delay factor.

Benefits of a service curve scheduler can be clearly seen when more than one traffic pattern with different requirements is vying for the same resources. For example, the policy depicted in FIG. 4 specifies that voice over IP (VoIP) traffic requires low delay (high priority) and FTP traffic requires high bandwidth allocation but no delay guarantees. This policy cannot be satisfied with a one piece linear line, such as that shown in FIG. 2. Yet a service curve scheduler can satisfy such requirements by using four slopes to define two different service curves, one service curve 401 for the FTP traffic class and one service curve 400 for the VoIP traffic class, as shown in FIG. 4. In this case, packets from the VoIP class are ideally scheduled before the FTP class as long as the long-term rate of the VoIP traffic remains below the m2 rate. When this is the case, the VoIP traffic effectively earns credit against its long term allocation such that it is allowed to burst for x time units at the higher m1 rate, while the FTP traffic is delayed. By choosing m1=m2+m3 equal to the link rate, the resulting outcome is that VoIP traffic has delay priority over FTP traffic and while the long-term rates of m2 and m3 are allocated to the VoIP traffic and the FTP traffic independent of the degree of delay priority afforded to the VoIP traffic.

While the service curve framework provides a flexible and general approach to controlling and providing QoS for network traffic, a question arises as to how to distribute the excess service when a traffic class does not fully utilize the service defined by the service curve. Rather than re-distributing the excess service, a service curve scheduler could simply leave the link idle, wasting the resource, and still meet the requirements of all of the specified service curves. A more efficient approach, however, is to redistribute the excess service in some fashion.

The distribution of excess available service has been referred to as link sharing in the literature and was studied by S. Floyd and V. Jacobson, "Link-Sharing and Resource Management Models for Packet Networks, IEEE/ACM Transactions on Networking, Vol. 3, No. 4, August 1995, in a system they called class based queuing (CBQ). In CBQ, traffic classes are arranged in a hierarchy. The hierarchy can be expressed as a tree where leaf classes represent actual traffic classes, with each leaf class having its own queue and queue management scheme. Internal nodes of the tree represent sharing policies. The root node represents the full link bandwidth. Each node is assigned a percentage of the bandwidth of its parent nodes such that the percentages assigned to a set of sibling nodes of a given parent node sum to a value equal to or less than 100%. In this fashion, bandwidth is apportioned to the leaf classes according to these percentages. When a leaf class does not fully utilize its allocated percentage of the bandwidth, that bandwidth is propagated to the parent and subsequently shared among the active siblings that could otherwise make use of the bandwidth creating a situation where the sibling node is allowed to exceed its allocated percentage of the bandwidth by effectively borrowing the bandwidth from the sibling who is not using it. In turn, if those sibling nodes do not have use for the excess bandwidth, that bandwidth is propagated further up the tree to be redistributed to yet other nodes in the bandwidth hierarchy.

Using such a hierarchy allows a network operator to create hierarchical policies. FIG. 5, for example, depicts a hierarchy where 50% of the bandwidth is allocated to class A, 25% to class B, and 25% to class C. In turn, class A1 receives 50% of the class A bandwidth, or 25% of the whole link. If class A1 does not use that bandwidth, then it is redistributed to other members of class A, namely class A2. If class A2 does not use that bandwidth, then it is further redistributed to class B and C in proportion to their allocations. This provides a tool to create desirable policy structures where bandwidth limits between competing classes are enforced but if the bandwidth is not otherwise being used, it is redistributed in a meaningful fashion.

However, the CBQ framework is not based on the service curve model and instead is defined through a set of operational descriptions and heuristic bandwidth estimation techniques. As a consequence, it has not been possible to prove definitive and useful properties of the overall system. In fact, for certain workloads, CBQ has been shown to deviate from its desired behavior.

To address these problems, I. Stoica, H. Zhang, and T. S. E. N G in an article entitled "A Hierarchical Fair Service Curve Algorithm for Link-Sharing, Real-Time and Priority Service", Proc. ACM SIGCOMM, 1997, the content of which is incorporated herein by reference in its entirety, proposed a solution for hierarchical link sharing built upon a service curve scheduler. Their scheme, called Hierarchical Fair Service Curve (HFSC), like CBQ, uses a tree to define the resource sharing policy but, in contrast to CBQ, assigns a service curve to each node in the tree rather than a percentage of bandwidth. By employing service curves, HFSC is able to control the tradeoffs between bandwidth allocation and delay priority. In addition, the service curve formalism enables the user to better define the operating behavior of an HFSC scheduler and to develop an explicit proof of the correctness of the algorithm in achieving the behavior.

While the HFSC framework is described in terms of arbitrary service curves, efficient implementations appear to be limited to only a very limited class of service curves. In particular, the systems disclosed in I. Stoica, H. Zhang, and T. S. E. N G, limit implementation to service curves that are composed of two linear pieces that must be convex or concave whereby the first segment passes through the origin. To highlight this limitation of the known practical realization of HFSC, the term HFSC2 is used herein to denote the HFSC algorithm when used with two-piece service curves.

FIG. 6 shows a pair of service curves 605 and 610 associated respectively with class 1 and class 2 traffics. The link rate is R bits/second, and m2 and m3 are selected such that m2+m3=R. Whenever class 1 is ready to be sent, its traffic is sent before traffic of class 2, up to the time x1. Because m1 is selected to be equal to the link rate, class 1 is transmitted at the link rate during the burst defined by times 0 and x1 and no other traffic is sent during this burst. If class 1 continues to be active after time x1, then the scheduler allocates service between class 1 and class 2 in proportion to the parameters m2 and m3. Because m2+m3 is selected equal to the link rate, class 1 will be serviced at m2 bits/second and class 2 at m3 bits/second. In this example, class 1 may correspond to a delay sensitive traffic like VoIP, and class 2 may correspond to all other traffic. As seen from the example shown in FIG. 6, HFSC2 algorithm implements the bandwidth and priority policies for these two classes in a manner consistent with the policy goals defined by service curves 605 and 610. However, when there are more than two traffic classes corresponding to two service curves with differing delay priorities, the problems with HFSC2 become evident, as described further below.

FIG. 7 shows service curves for three traffic classes, namely traffic class 1, class 2, and class 3, defined respectively by service curves 801, 802, and 803, respectively. In addition, there are three delay priorities corresponding to regions 720, 722 and 724 along the x-axis. The leaf nodes associated with these traffic classes are arranged into a link sharing hierarchy assuming all three classes are siblings of the parent root node, whose link rate is R bits/second. The slopes of the service curve 705 are m1 in region 720 and m2 in region 722. The slope of service curve 710 is m3, and the slope of the service curve 715 is m4. To cause class 1 to have the highest priority, m1 is chosen equal to the link rate R and x1 is chosen to be the maximum burst time for the class 1 traffic. Likewise, it would be desirable to choose m2+m3 also equal to the link rate R. Yet herein lies a problem.

Because HFSC2 allows only for two-piece linear curves, slopes m2 and m3 on service curves 705 and 710 must continue from region 722 into region 724 at the same slope. Since service curve 715 becomes non-zero in region 724, therefore, m2+m3+m4 must be less than or equal to the link rate R. Thus, if m2+m3 is selected to be equal to link rate R, m4 must be equal to 0. However, to create a useable service curve, m4 must be greater than 0 which, in turn, means that that m2+m3 must be chosen so as to be smaller than the link rate R in region 722. If m2+m3+m4 is selected to be equal to the link rate R—a desirable outcome since over the long term, all of the link rate should be fully allocated across all traffic classes—then m4 is defined by R−(m2+m3). That is, the amount of unallocated service in region 722 is m4.

Given that there must be unallocated service left in region 722, the question arises to what the HFSC2 scheduler will do with that unallocated service when all classes are active. To illustrate that, assume that all classes become active at time t=0. At this point, class 1 is serviced for x1 seconds at the link rate R. Since all the service is allocated to class 1 in this time frame, no other class is serviced. As time passes into region 722 at time x1, class 1 and 2 traffics are serviced. While in region 722, class 1 and class 2 traffics will be serviced according to the real-time criterion in order to meet the service curves of those two leaf classes. However, since m2+m3<R, there is spare, unallocated service that will be served according to the link sharing criterion. In this situation, the HFSC2 algorithm chooses the class whose virtual time is the smallest. Since class 3 has not yet been serviced at all, its virtual time is 0 while classes 1 and 2 have virtual times larger than 0 because they have been active and have been given service. Hence, class 3 will be serviced at this time. Moreover, class 1 and class 2 will continue to be serviced in region 722 to meet their real-time requirements, causing each of class 1 and class 2's virtual times to be increased according to the algorithm.

As time continues to proceed through region 722, it turns out that the virtual times of each of the classes moves forward in a manner such that class 3 receives all of the unallocated bandwidth (i.e., m4 bits/sec) of region 722, while class 1 and class 2 are given the minimum amount required to meet the service curve requirements. In effect, regions 724 and 722 begin to merge and the class 3 service curve is translated from point x2 toward point x1. In other words, the HFSC2 algorithm treats the service curve specifications in FIG. 8 the same as it does the service curve specification shown in FIG. 7. This means that there is no delay priority achievable between class 2 and class 3 even though this was the apparent design goal of the service curves in FIG. 7. This is a major shortcoming associated with the HFSC2 algorithm.

FIG. 9 depicts service curves that achieve the policy goals of the service curves associated with FIG. 7. Services curves 905 and 915 associated with traffic classes 1 and 3 are the same as service curves 705 and 715 shown in FIG. 7, but the service curve 710 associated with class 2 has been modified to be a 3-piece curve 910, having a first piece with slope 0, a second piece with slope m3 between times x and x1, and the third piece with slope m4 starting at time x2. Slope m3 is selected to be equal to the link rate R minus m2. Since m2+m3=R, all of the service will be allocated to classes 1 and 2 before it is allocated to class 3 when class 2 goes from an inactive to an active state. In other words, this arrangement of service curves achieves the desired priority and bandwidth guarantees.

The various operations that are performed on a 2-piece curve always result in another two-piece curve. Thus, the computation and data structures required to implement the process with 2-piece curves remains relatively simple. However, the various operations that are performed on a 3-piece curves no longer result in another 3-piece curve. Rather, each operation can increase the number of pieces. Thus, the data structures and computations required to implement the processes associated with a 3-piece curve can grow with each operation. This can lead to impractical computational complexity.

While service curve schedulers have been proposed and studied in the research community, they have not had much impact in practice. Their lack of widespread adoption by industry is likely rooted in the abstract and complex nature of the service curve model. A typical network operator would have difficulty not only understanding the mathematical principles and formalism of the service curve model, but would also likely be at a loss as to how to configure service curves in a networking device to effect desired QoS policies. It is neither easy for a network operator to understand and reason about service curves nor obvious how to relate such service curves to administrative policies. And the research literature has devoted no attention to the problem of designing auxiliary support systems to make an underlying service curve scheduler understandable and manageable.

BRIEF SUMMARY OF THE INVENTION

In accordance with an embodiment of the invention, a method for configuring service curves for managing the output port of a networking device includes the following steps. A multitude of traffic classes is defined, each traffic class being characterized by a bandwidth and a delay priority. A multitude of traffic service curves is computed, each of the plurality of traffic service curves is associated with a different one of the multitude of traffic classes. At least one of the multitude of traffic classes service curves is characterized by a shifted two-piece linear function shifted such that the service curve limits service to during a nonzero time period prior to the start of the two-piece linear function.

In one embodiment, each traffic class is further characterized by a burst parameter that defines an amount of time the traffic class is allowed to pre-empt traffic classes having lower delay priorities. In one embodiment, each of the shifted two-piece linear functions is unshifted.

In one embodiment, a screen is displayed to a user via a user interface. Data representative of the bandwidth, the delay priority and the name associated with each traffic class is received from the user by the interface. In another embodiment, the delay priority associated with each class is generated in accordance with the burst parameter defined for that class. In one embodiment, the burst parameter is defined in units of time. In another embodiment, the burst parameter is defined in units of packets.

In one embodiment, a link sharing policy is configured for each traffic class independently from the service curve associated with each traffic class. Data representative of the link sharing policy for a traffic class is optionally received from the user via the user interface. In one embodiment, an overflow traffic class is assigned to a number of traffic classes. The overflow traffic assigned to each class has the highest priority to use any excess bandwidth not used by its associated traffic class.

BRIEF DESCRIPTION OF THE DRAWINGS

FIG. 13 is an algorithm adapted to compute service curve parameters for each traffic class represented by a set of four parameters, in accordance with one embodiment of the present invention.

FIG. 14 shows a high level arrangement of a number of devices disposed in a network including a user interface with which an operator interacts with, in accordance with one exemplary embodiment of the present invention.

DETAILED DESCRIPTION OF THE INVENTION

Figure 1:
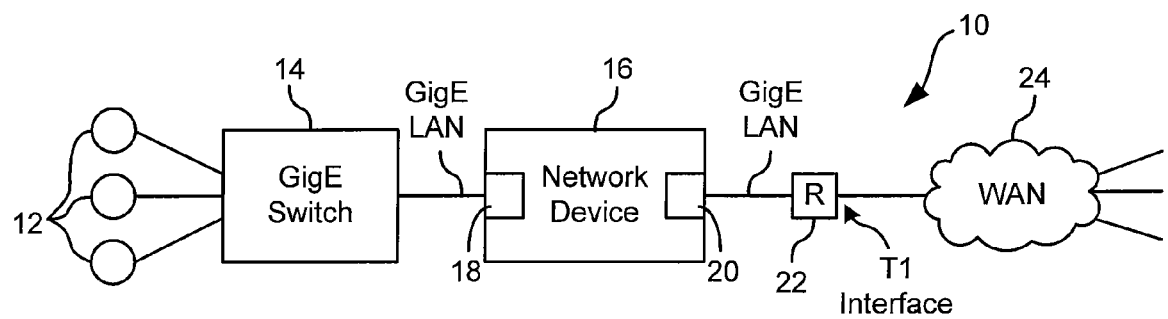
FIG. 1 is a block diagram of a number of devices forming a network, as known in the prior art.
Figure 2:
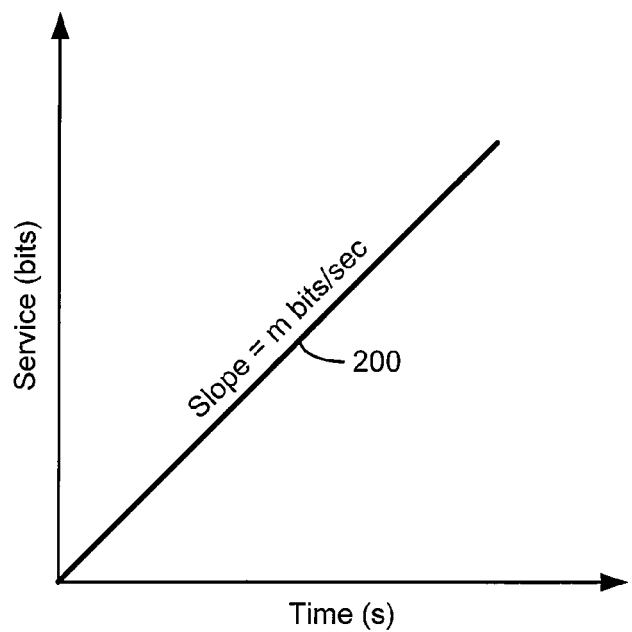
FIG. 2 shows a service curve having a single slope, as known in the prior art.
Figure 3:
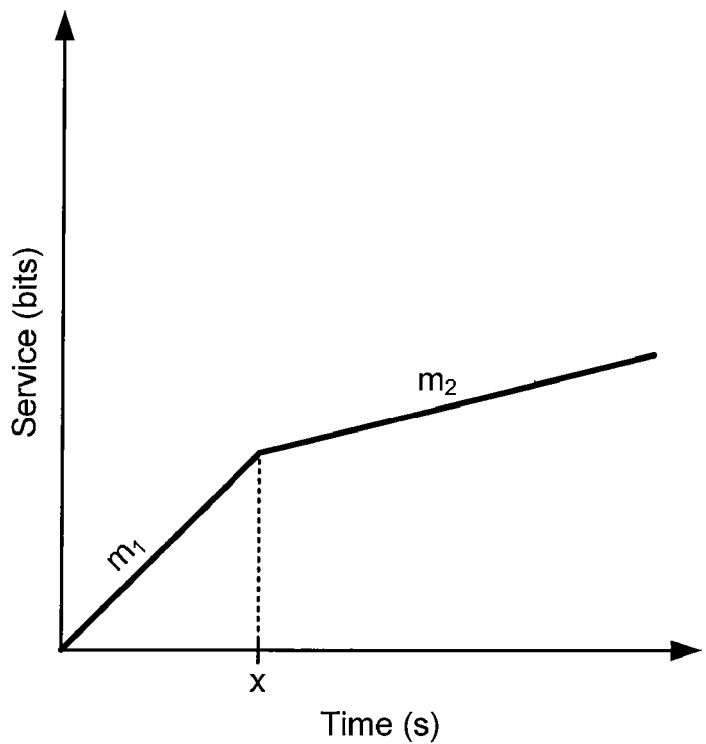
FIG. 3 shows a service curve having two slopes, as known in the prior art.
Figure 4:
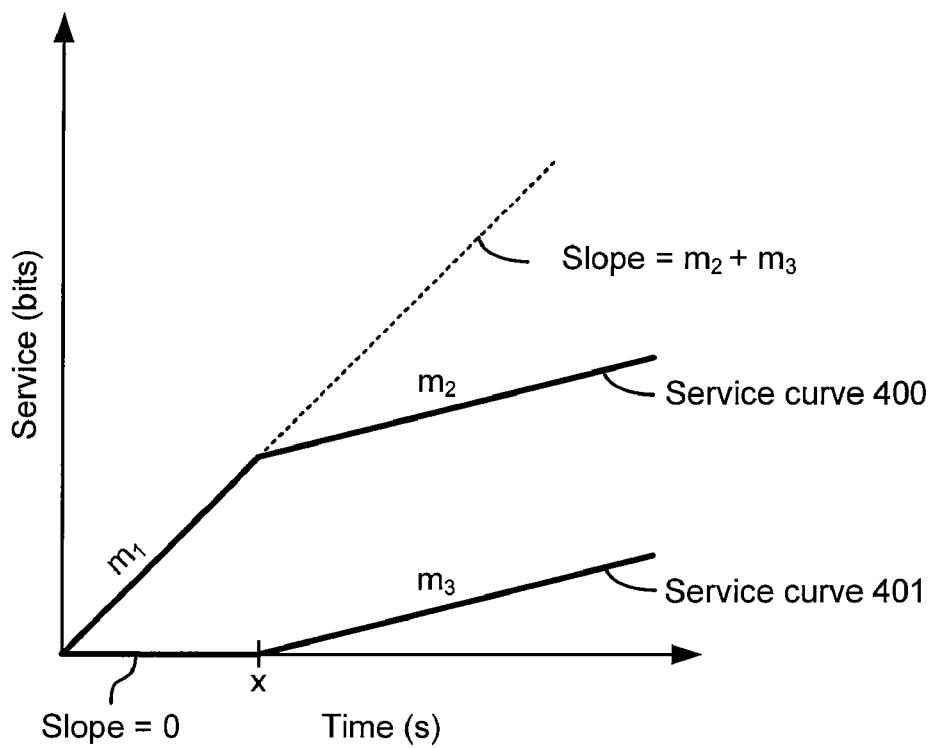
FIG. 4 shows a pair of service curves one of which is associated with a traffic class having a higher priority than the other, as known in the prior art.
Figure 5:
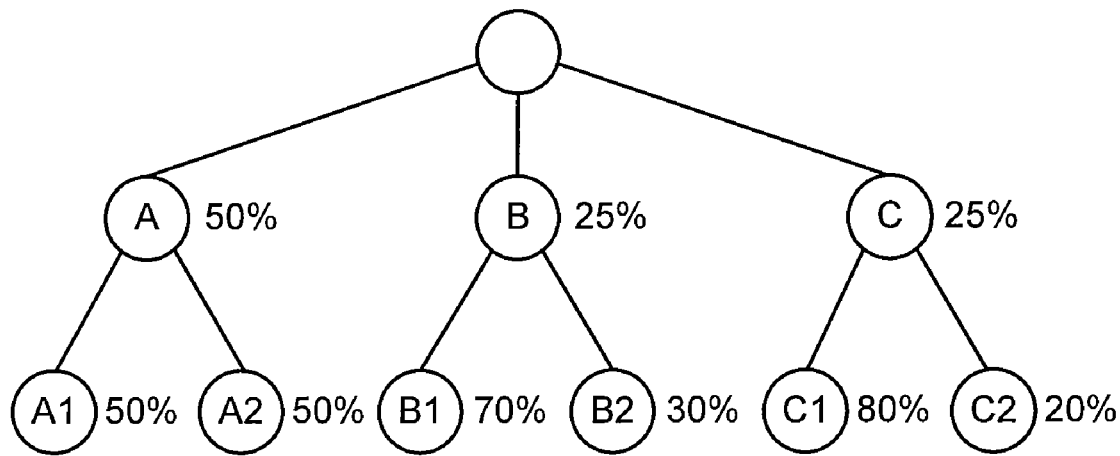
FIG. 5 shows a hierarchy of traffic classes and their associated bandwidths, as known in the prior art.
Figure 6:
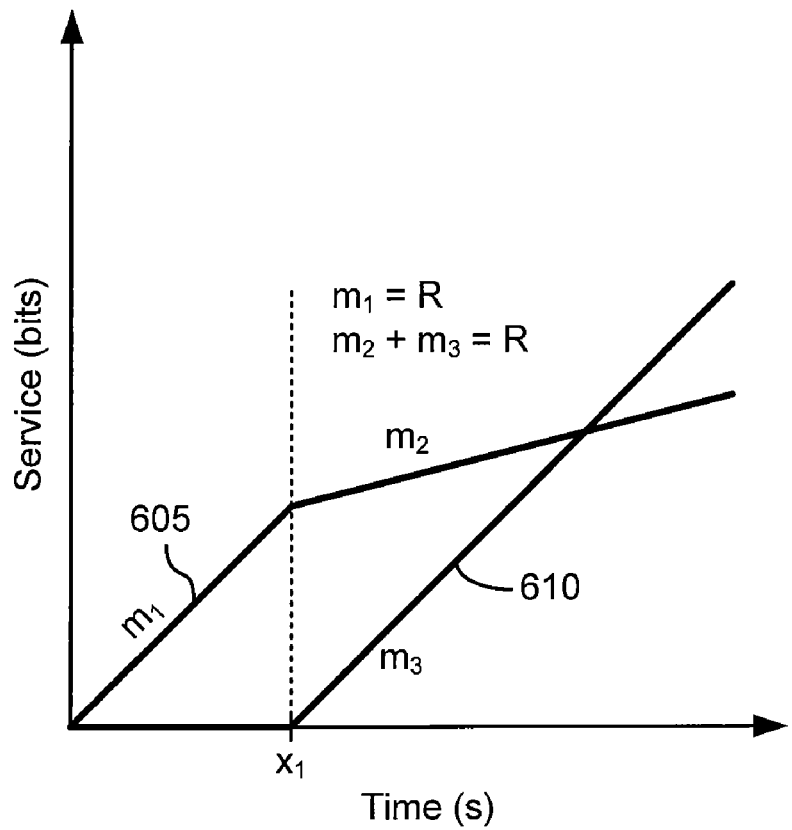
FIG. 6 shows a pair of service curves one of which is associated with a traffic class having a higher priority than the other, as known in the prior art.
Figure 7:
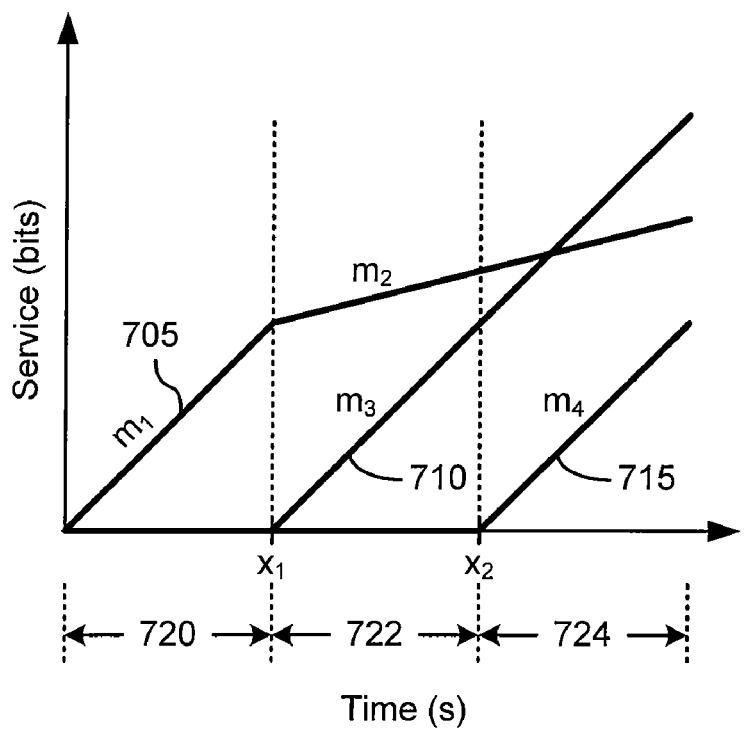
FIG. 7 shows service curves for three different traffic classes, as known in the prior art.
Figure 8:
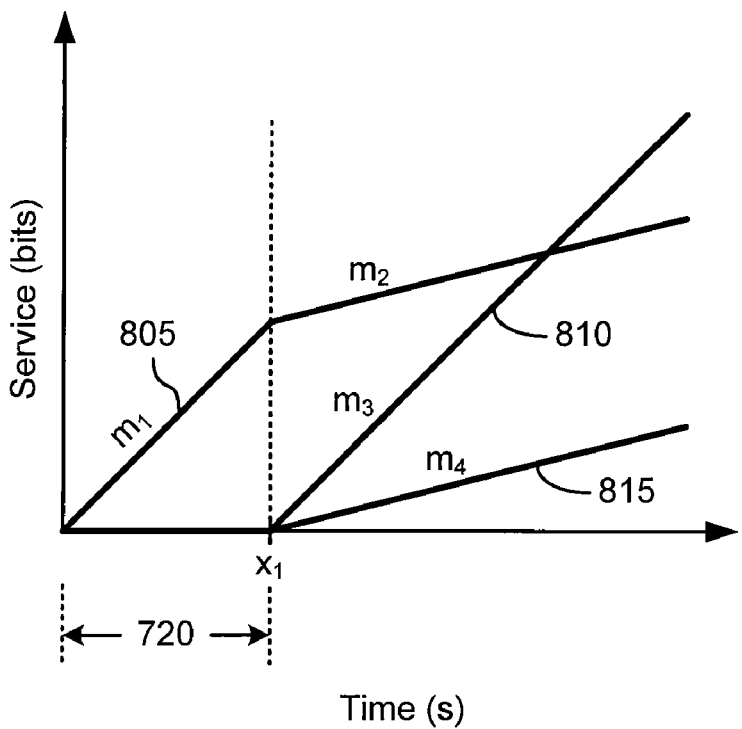
FIG. 8 shows service curves for three different traffic classes, as known in the prior art.
Figures 9, 10:
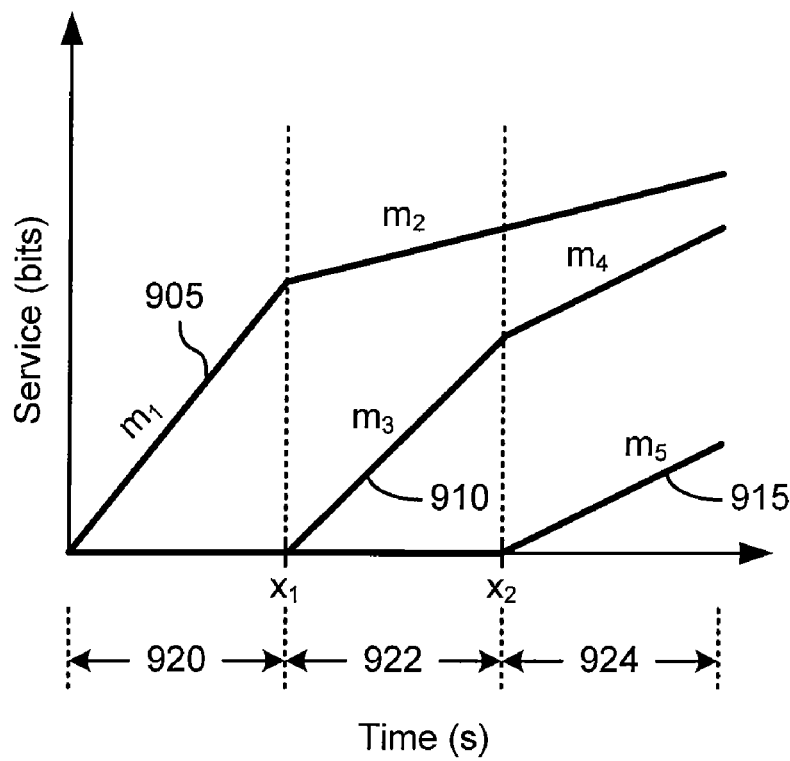
FIG. 9 depicts service curves that achieve the policy goals of the service curves associated with FIG. 7.
FIG. 10 is an exemplary pseudo code for transforming a three-piece linear service curve to a corresponding two-piece linear service curve, in accordance with one embodiment of the present invention.

In accordance with one embodiment of the present invention, a 3-piece linear service curve is transformed into a two-piece linear curve to enable concurrent attainment of traffic class delay priority and long-term bandwidth allocation on the one hand, and a computationally efficient algorithm for representing and processing the transformed service curve, on the other. In accordance with this algorithm, the computation of a new deadline parameter, as specified in the update_ed and update_d pseudo code functions defined by I. Stoica, H. Zhang, and T. S. E. N G, in an article entitled "A Hierarchical Fair Service Curve Algorithm for Link-Sharing, Real-Time and Priority Service", Proc. ACM SIGCOMM, 1997, the content of which is incorporated herein by reference in its entirety, is modified such that each traffic class k is configured with a fixed offset called u_i in order to achieve the transformation. The fixed offset value is included as a term that is added to the new deadline d_i where it is updated. The data structures that maintain and manage service curves of the present invention are realized with those used in connection with 2-piece linear curves. The algorithm of the present invention thus retains the computational efficiency of the HFSC algorithm. An exemplary pseudo-code of the algorithm is shown in FIG. 10.

Figure 11:
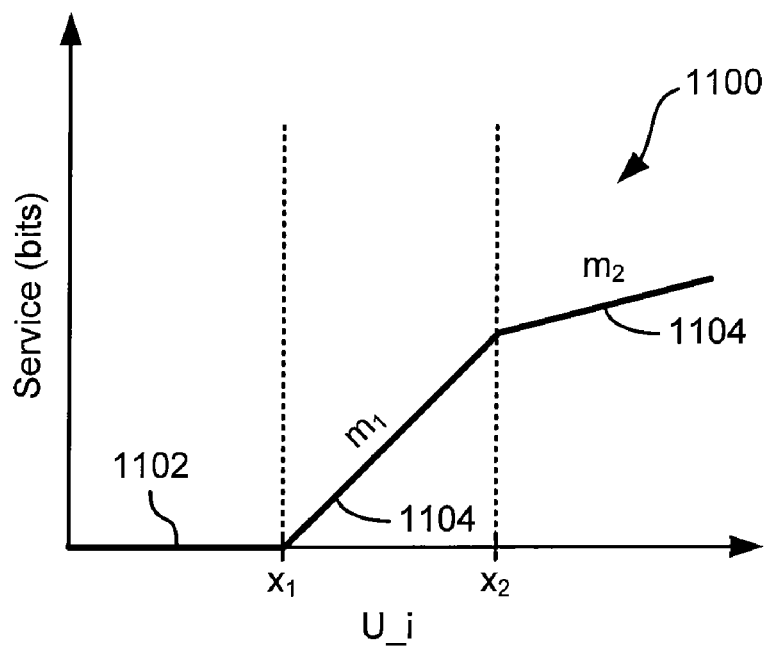
FIG. 11 shows a transformed (shifted) two-piece linear service curve, in accordance with one embodiment of the present invention.

FIG. 11 shows a transformed (shifted) two-piece linear service curve 1100 used in accordance with the algorithm of the present invention. Such a shifted linear service curve supports both two-piece linear convex and two-piece linear concave curves, where in both cases the first segment is coincident with the origin. Furthermore, a linear service curve in accordance with the present invention, referred to herein as a shifted concave curve, includes three linear segments, namely a first segment 1102 that is coincident with the x-axis and passes through the origin, a second segment 1104 with slope m1>0 beginning at time x1=u_i, and a third segment 1106 with slope m2>0 beginning at time x2. By adding the offset parameter u_i to the deadline computation, the algorithm causes the scheduler to emulate the shifted concave curve for the purposes of the real-time service request scheduling decision. The modification achieved by the algorithm of the present invention thus enables the realization of the service curve framework of FIG. 9.

Figure 12:
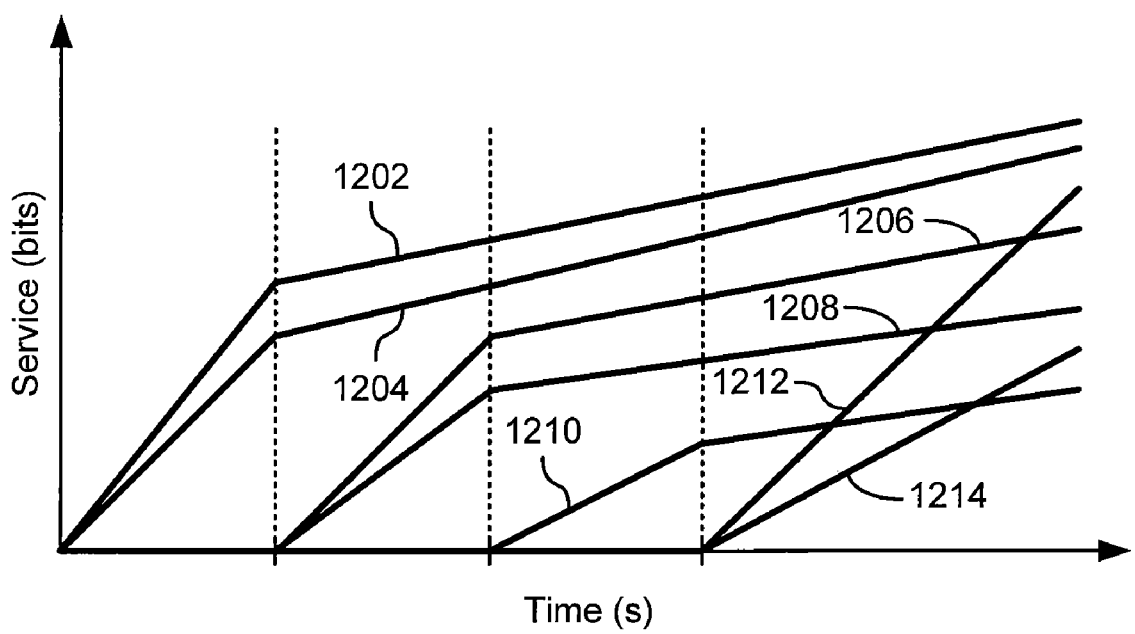
FIG. 12 shows a family of shifted service curves that enable decoupling of the delay and bandwidth requirements, in accordance with one embodiment of the present invention.

FIG. 12 shows a family of service curves 1202, 1204, 1206, 1208, 1210, 1212 and 1214 that decouple delay and bandwidth requirement by using a set of shifted concave curves. Accordingly, the entire bandwidth of the link can be allocated to the non-zero service curve segments in each region. This means that when each of the classes that correspond to their respective service curves are active, all of the bandwidth is utilized thus preventing a lower-priority class from using otherwise excess bandwidth.

Service Curve Mapping Strategy

In some embodiments, the service curves are automatically computed based on high level policy parameters specified by the network operator or user. In this framework, the operator assigns each traffic class a delay priority category from 1 to M, where M is the total number of priority categories. Each delay priority category has an associated burst parameter, $T\_1, \ldots T\_M$, where $T\_k$ defines the amount of time classes in delay priority category k are allowed to pre-empt traffic from classes in delay priority categories $k+1, k+2, \ldots M$, upon transitioning from an inactive to an active status. The sequence of $T\_1, \ldots T\_M$ defines a partition of the x-axis into adjacent non-overlapping regions at $x1=T\_1$, $x2=T\_1+T\_2, \ldots$ representing the M delay priority categories available to traffic classes.

In some embodiments of the present invention, the values $T\_1, \ldots, T\_M$ are specified by the network operator. In other embodiments, the values could be pre-configured using heuristics or design calculations. Parameter, $T\_k$ corresponds to the amount of time required to transmit a number of average size packets over the link being managed. This value is typically small to avoid starving out lower priority classes for extended periods of time, but can be made larger if the environment or design considerations call for such a configuration.

The service curve abstraction feature provides a precise mechanism by which delay priority is defined because it allows the specification of the period in accordance with which a given class has priority over another, while both classes are active. After the expiration of this period, the two classes share bandwidths according to their respective bandwidth guarantees. When one or both of the classes go idle, and then become active, the preemption can take place once again as allowed by the service curve guarantees.

The delay priority regions can have intuitive names to maintain an easy and intuitive end user interface and setup process. For example, the following nomenclature could be adopted for the various delay priority regions:

1. Realtime
2. Interactive
3. Business Critical
4. Normal
5. Low Priority

Accordingly, delay priority region 1 may be assigned for real-time traffic like VoIP or video conferencing. Delay priority region 2 may be assigned for interactive traffic like a terminal session, a remote login, or a market trading application. Delay priority region 3 may be assigned for business critical traffic like important file transfers or e-mail traffic. Delay priority region 4 may be assigned for normal traffic like Web browsing of internal application servers. Delay priority region 5 may be assigned for low priority traffic like Web browsing of external Internet sites, or low-priority replication traffic. This listing of possible delay priority regions is merely illustrative and is not meant to limit the scope of this disclosure. It is understood that other naming conventions and practices may be used.

With the delay priority categories defined in such a fashion, traffic classes can be assigned to the various categories in an intuitive manner. A network operator thus does not have to figure out all of the x-axis points at which the various service curves must fall. Instead, the network operator merely specifies that a traffic class is a real-time class or a low-priority class and so forth, while still enjoying all the rigors of the underlying service curve scheduling model.

As an example, assume that a VoIP traffic class is assigned to the Realtime region, while a file transfer class is assigned to the Normal region. The VoIP traffic might be guaranteed 1 Mb/s while the file transfer class is guaranteed 2 Mb/s. If it is then assumed there is only VoIP and file transfer traffic flowing over the network, and provided the offered load of the VoIP traffic remains less than 1 Mb/s then VoIP packets will always be serviced before file transfer packets.

More specifically, to configure a QoS policy, the operator assigns a bandwidth guarantee and a delay priority category number to each traffic class. Assume there are N traffic classes, $1, 2, \ldots, N$. Assume that the bandwidth guarantee for traffic class k is designated with $B\_k$, where $k=1, \ldots, N$, and the priority category for traffic class k is designated with $P\_k$. Further assume that $T\_k$, the burst parameter, defines the amount of time classes in delay priority category k are allowed to pre-empt traffic from classes in delay priority categories $k+1, k+2, \ldots M$, upon transitioning from an inactive to an active status. As described above, the sequence of $T\_1, \ldots T\_M$ defines a partition of the x-axis into adjacent non-overlapping regions at $x1=T\_1$, $x2=T\_1+T\_2, \ldots$ representing the M delay priority categories available to traffic classes. Note that $P\_k$ is in the set $\{1, \ldots, M\}$.

Upon receiving input or commands via a user interface from the network operator, a management process computes N service curves, one for each traffic class, and finally configures a service curve scheduler with the computed service curves. Each shifted concave service curve is represented by the 4-tuple (x1, x2, m1, m2). The management process computes these parameters for each traffic class. The service curve of a class k is denoted herein by $(x1(k), x2(k), m1(k), m2(k))$. An efficient algorithm to compute these service curve parameters for each class is illustrated in FIG. 13. The algorithm assumes as input the number of classes, the bandwidth guarantee of each class, the delay category of each class, the number of delay categories, the burst size (in time) of each delay category, and the rate of the underlying link being managed. From these input parameters, the algorithm computes a service curve for each class. The process via which input values are obtained via a user interface are described further below.

Once these shifted concave service curves have been computed, they can be configured in a system implementing the algorithm of the present invention by un-shifting each of the shifted concave curves to create a normal concave curve coincident with the origin along with determining the delay offset $u\_k$ for each traffic class $k=1, \ldots, N$. Assume that the parameters for the un-shifted, two-piece curves are referred to as x'(k), m1'(k), and m2'(k) for each traffic class k. Accordingly, x'(k) is the x-offset of the break in the two-piece linear curve, m1'(k) is the slope of the first segment of the curve coincident to the origin, and m2'(k) is the slope of the second segment of the curve beyond x'(k). For each class, these additional parameters can be computed as follows:

$u\_k = x1(k)$ $m1'(k) = m1(k)$ $m2'(k) = m2(k)$ $x'(k) = x2(k) - x1(k)$

One embodiment of the present invention provides an operator of a networking device an intuitive mechanism and user interface for manipulating and configuring QoS policies that are automatically mapped onto service curves and configured into a service curve scheduler. Rather than expose the service curve definitions to the operator, which would be overly complex and difficult to understand, the operator can express QoS policies in terms of bandwidth allocations and delay priorities and have the system automatically generate the service curves to implement those polices. Herein, the process of translating high level administrative policies and parameters into service curves is called service curve mapping.

FIG. 14 shows a high level arrangement of how a network operator interacts with a system, in accordance with one exemplary embodiment of the present invention. The operator manipulates a user interface 1400, that may be a graphical interface, a command-line interface, or the like to create, delete, and otherwise configure traffic classes and the various parameters associated with such classes. Such an interface may be embedded in a networking device, e.g., as a Web browser, or a command-line interface available over, e.g., an SSH login, or it may be a separate software running on a management console and interacting with the networking device over the network. The user interface 1400 is in communication with a management process block 1405 that accepts input from the user, performs various transformations and computation as described herein to generate service curve specifications and so forth. The management process block 1405 can also provide feedback to the user interface 1400 to indicate back to the user (operator) the status of the configuration actions and the state of the managed networking device. The management process block 1405 configures the desired service curves into a service curve scheduler 1410 that may be embedded in a networking device.

In accordance with another embodiment of the present invention, a user interface enables the network operator to manage a service curve scheduler. The user interface provides a means by which bandwidth and priority levels are specified and the service curves required to meet those bandwidth and priority levels are automatically calculated without requiring user aid by the management process.

Figure 15:
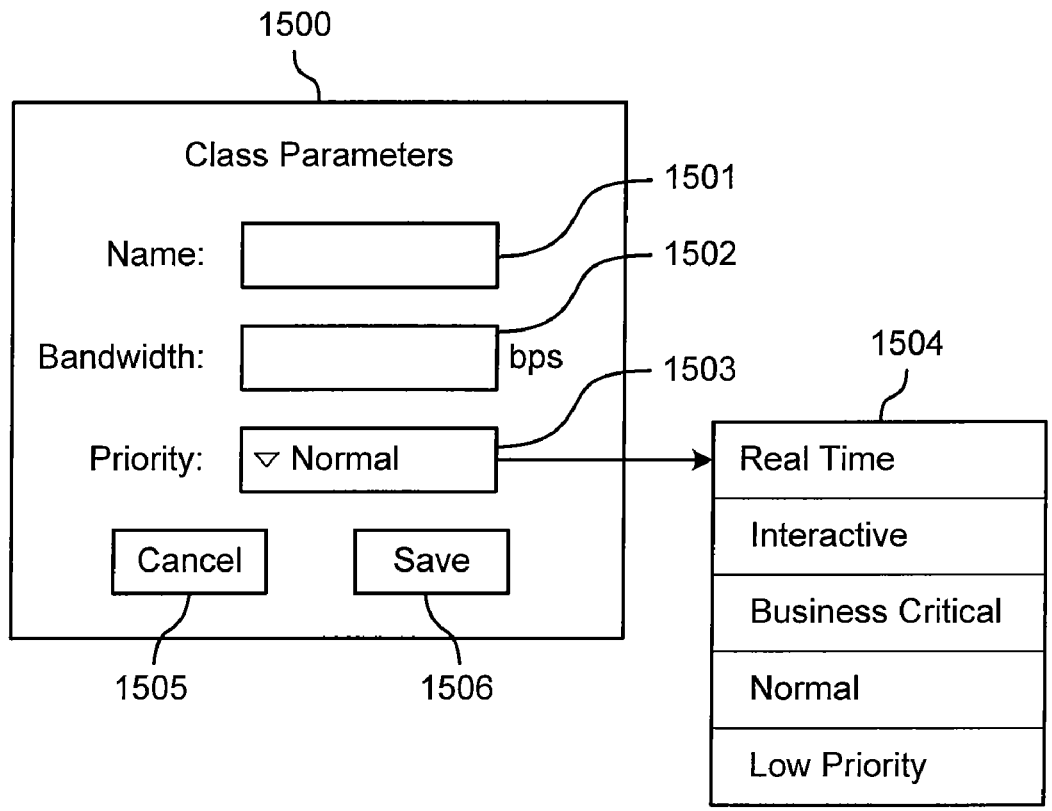
FIG. 15 illustrates a user interface adapted to allow entry of parameters associated with various traffic classes, in accordance with one embodiment of the present invention.

FIG. 15 illustrates a possible user interface 1500 in accordance with one embodiment of the present invention. As shown in FIG. 15, the network operator may enter the parameters for a traffic class, namely, a minimum bandwidth and a delay priority category. The user interface includes a type-in box 1501 for the class name, a type-in box 1502 for the bandwidth guarantee, and a drop-down menu 1503 for the delay priority category, which includes a drop-down list of options 1504, as well as buttons to save 1506 or abort 1505 the edits. The list of priority categories can either be built into the system a priori or it could be configured elsewhere as part of the process by which the network administrator configures QoS and/or CoS policies. A class name is assigned to the traffic class for easy identification. Separate traffic classification rules are specified elsewhere to dictate how network packets are mapped onto classes using any one of a number of well known techniques.

The "Save" and "Cancel" buttons are used to save or abort the edits. After entering the parameters via the user interface, and clicking the Save button, the contents are communicated to the management process, which then carries out the computations described here in to manipulate an underlying service curve scheduler's configuration.

Figure 16:
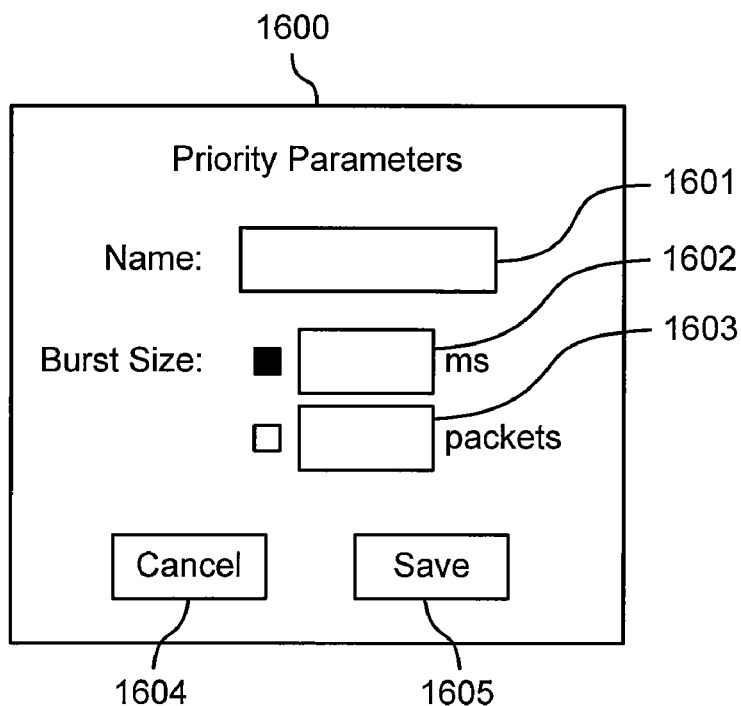
FIG. 16 shows a user interface adapted to enable the creation and configuration of priority categories, in accordance with one embodiment of the present invention.

FIG. 16 shows a user interface 1600 for creating and configuring priority categories, in accordance with one embodiment of the present invention. A type-in box 1601 is provided for the category name. Type-in boxes for the burst size for of the category are entered either as a time parameter 1602, e.g., in milliseconds, or as a number of packets parameter 1603. Alongside either of these two type-in boxes are radio-button style check boxes allowing the operator to select the preferred specifications. While service curves are based on time values, a time value can be computed from a number of packets specification by taking the average packet size and multiplying be the link rate, yielding a good approximation for a burst size parameter. Elsewhere the operator may define an ordering of the delay priority categories. This could be presented as an ordered list with an up and down button next to each entry to move its place in the list. Alternatively, each category may simply be given a rank number and the categories could be ordered by ranking. The rank could be obtained from the user by extending the box in FIG. 16. Other user interfaces may be available to delete classes or delete priority categories.

Figure 17:
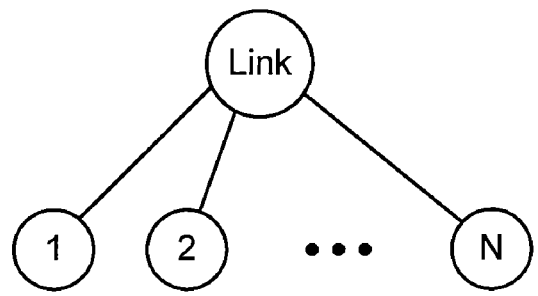
FIG. 17 shows a link sharing hierarchy.

The following is a description of a scheme for influencing how the link sharing hierarchy is configured in accordance with another embodiment of the present invention. By default, a simple hierarchy can be adopted whereby all of the classes are arranged in a flat structure such that each class is a child of the root class representing the entire link bandwidth. Such a scheme is illustrated in FIG. 17. In accordance with this scheme, when a class does not utilize its full allocation of bandwidth, the excess bandwidth is allocated to other active classes in proportion to the weights defined by m2 parameters of the service curve of each of active class, as in weighted fair queuing.

Independent Bandwidth Sharing

In accordance with the another embodiment, when excess bandwidth is available to the scheduler, i.e., when all of the service curve guarantees have been achieved and yet there is additional link capacity available, then the excess bandwidth is apportioned in proportion to the long-term bandwidth guarantees of the traffic classes, i.e., the m1 parameters of all the active service curves. However, there is no need to couple the link sharing logic to the real-time service curve guarantees, and a separate data structure may be employed to represent the link sharing polices. In the instant process, each node in the class hierarchy maintains a virtual time that represents the normalized amount of service that the corresponding class has received, independent of the real-time service curve. The process attempts to minimize the discrepancies between the virtual times of different nodes to effect sharing. Since the virtual time manipulation can be managed independently from the real-time service curve scheduling guarantees, a parallel class hierarchy may be utilized to the represent the link sharing schema.

In a more detailed embodiment, the algorithm of the present invention described herein may be further adapted to specify the link sharing policies separately from the real-time service guarantees, and optionally to present this in the user interface as a separate policy specification for controlling the apportionment of excess bandwidth. Further, since the real-time guarantees derive exclusively from the service curves of leaf classes and since the link sharing policies derive from the hierarchical arrangements of internal nodes in the class tree, these specifications can be separated to simplify configuration by the network operator.

A user interface may present the user with an option to create sharing classes and specify the parent-child relationships among the sharing classes. Each traffic class, e.g., as defined by FIG. 15, would further be designated as a member of a sharing class. Each sharing class would be assigned a fraction of the link bandwidth, or a fixed amount of the link bandwidth.

Figure 18:
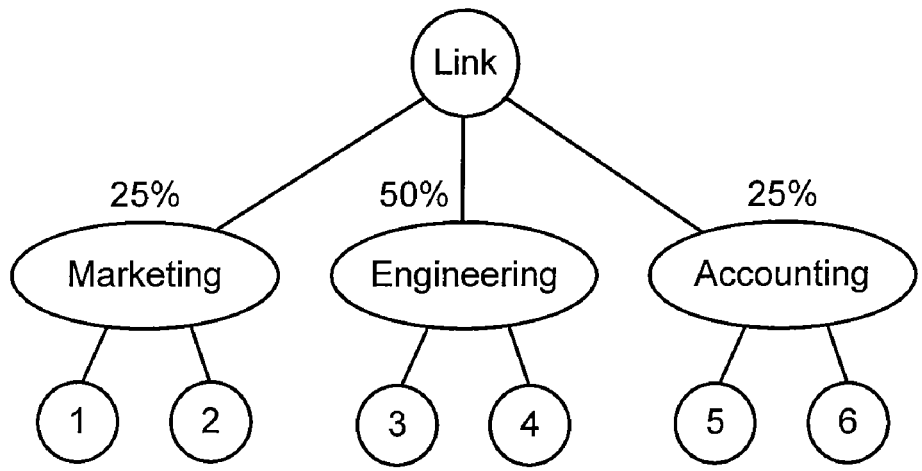
FIG. 18 shows a class hierarchy that includes six leaf classes and three sharing classes.

For example, FIG. 18 depicts a class hierarchy that includes six leaf classes and three sharing classes called "marketing", "engineering", and "accounting". For the purposes of link sharing, the three sharing classes are assigned percentages of the root class that represents the entire link, in this case 25% for marketing, 50% for engineering, and 25% for accounting. In some other examples, the service curves rather than percentages for link sharing may be used. As is understood, a percentage of link bandwidth is simply a single piece linear service curve coincident with the origin.

Continuing with the example of FIG. 18, when spare bandwidth is available, it will be allocated such that the overall use of the link achieves these sharing percentages. For example, if there were no marketing traffic present but there was a sustained load of engineering and accounting traffic, then excess bandwidth would be allocated such that engineering received $2/3$ of the link bandwidth (i.e., $1/2/(1/2+1/4)$) and accounting would receive $1/3$ of the link bandwidth (i.e., $1/4/(1/2+1/4)$).

In a further embodiment, the network operator is relieved of the burdensome task of specifying service curve parameters and a link sharing hierarchy through automation. As in the previous technique for service curve mapping for the real-time traffic classes, service curve schedulers might include a scheme for automatically computing a link sharing hierarchy from operator defined policies. In one such technique, each of the traffic class definitions that the operator specifies, as shown for example in FIG. 15, is augmented to include a named bandwidth sharing category. In this approach, each of the named sharing categories is guaranteed to obtain an equal share of the bandwidth such that provided all of the real-time service curves are guaranteed, then any remaining bandwidth will be allocated to classes in a fashion that causes the sharing categories to have equal bandwidth.

Figure 19:
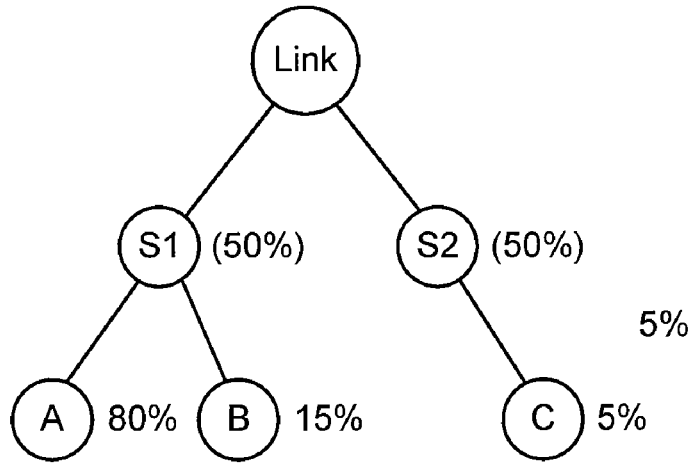
FIG. 19 shows a hierarchy of three classes two of which form a first sharing category, with a third class forming a second sharing category.

For example, in FIG. 19, there are three classes A, B, and C. Classes A and B are assigned to sharing category S1 and class C is assigned to sharing category S2. Further suppose the bandwidth guarantee of class A is 80% of the link, class B is 15% of the link, and class C is 5% of the link. If all three classes are active, the scheduler apportions the link bandwidth according to the class guarantees. But suppose only classes B and C are active. In this case, the scheduler will allocate 50% of the bandwidth to class B and 50% of the bandwidth to class C because of the sharing policy. Suppose instead classes A and C are active while class B is idle. In this case, the scheduler will allocate the guaranteed 80% of the link bandwidth to class A, as guaranteed by the service curve, and allocate the remaining 20% to class C. In this case, as the algorithm attempts to minimize the discrepancy between the sharing goal (50/50) and the service guarantee (class A gets 80% of the link), it allocates all of the excess to class C.

Figure 20:
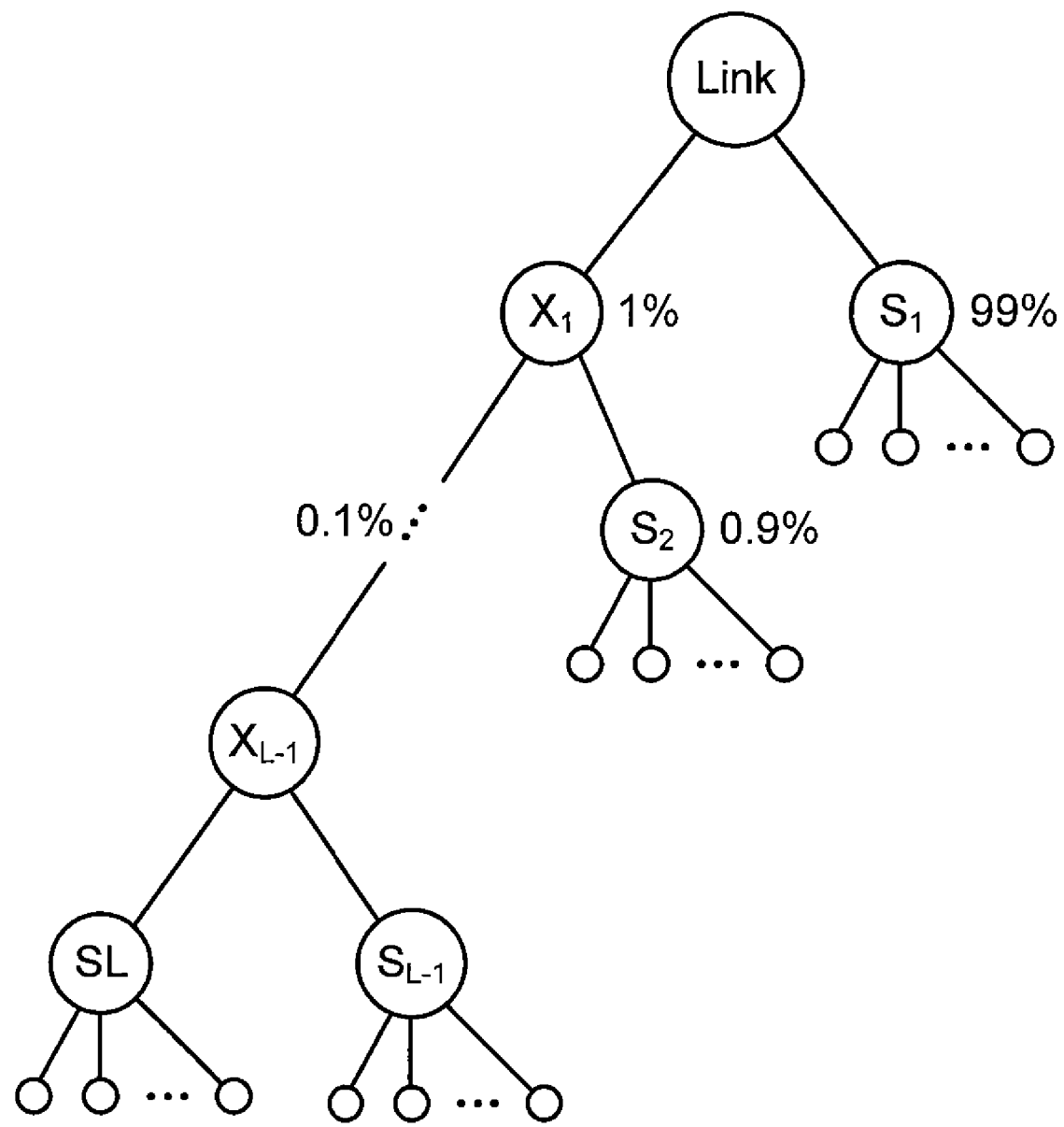
FIG. 20 shows a hierarchy of three classes adapted to share bandwidth according to a priority order.

In accordance with another exemplary embodiment for mapping sharing policies onto a link sharing class hierarchy, the sharing classes are arranged as in FIG. 20. In this embodiment, bandwidth is shared according to a priority order. Here it assumed there are L sharing priority levels and each traffic class is assigned one of the sharing priority levels, e.g., by modifying the class specification from FIG. 15 to include a sharing priority level. To construct the hierarchy, there are L sharing classes $S\_1, S\_2, \ldots, S\_L$, that form sharing category 1, and L-1 additional sharing classes $X\_1, X\_2, \ldots, X(L-1)$ that form sharing category 2. Sharing class $S\_1$ is assigned 90% of the link bandwidth and $X\_1$ 10% of the link bandwidth. $S\_2$ is assigned 90% of $X\_1$'s bandwidth (or 9% of the total) while $X\_2$ is assigned 10% of $X\_1$'s bandwidth (or 1% of the total). This pattern repeats. Then, each traffic class that is assigned to sharing level k is configured as a child of sharing class $S\_k$.

Given this arrangement, when there is unallocated service, the traffic classes in sharing category 1 are serviced such that they receive 99% of the link bandwidth. Once this is achieved, any excess service is provided to the classes in sharing category 2, and so forth. If on the other hand, the classes in sharing category 1 are not active, then excess service will be apportioned to sharing category 2 until those classes receive 99% of the link rate, and so forth. In this fashion, excess bandwidth is allocated in priority order within a factor of 1%.

In another embodiment for implementing link sharing, the network operator configures each traffic class to refer to another traffic class. With respect to the first traffic class, the second traffic class is called an "overflow class". The design goal is that when a given class does not use all of its guaranteed service, the excess service is distributed to the overflow class first. If the overflow class does not utilize the service, then the excess is further distributed across all active classes in proportion to their bandwidth guarantees as in weighted fair queuing. If no overflow class is specified for a given traffic class, then excess service from that class is distributed in proportion to their bandwidth guarantees as in weighted fair queuing without first being allocated to an overflow class.

This scheme is further described below. Instead of allowing excess service to flow up and down the link sharing hierarchy, as in HFSC and CBQ, the link sharing tree is replaced with a link sharing directed acyclic graph (i.e., DAG), where the directionality of each edge is incorporated in an alternative link sharing algorithm. In this model, excess service can flow only in the direction of a directed edge. Each time a class is serviced, i.e., the scheduler transmits a packet from the class, then the virtual times of each class along the tree from the leaf class to the root are updated as in the original process. Since there is now a DAG in place of a bidirectional tree, the new process requires that there be a set of directed edges from the leaf class through zero or more internal sharing classes, to the root. Conversely, a different set of directed edges flow from the root down the DAG to reach the leaf classes. When the scheduler decides to transmit a packet according to the link sharing rules, instead of traversing down the tree along any of the tree edges to find the earliest virtual time, the modified process follows only the directed edges that point downward toward the leaf classes.

In order to configure such a link sharing, a DAG is computed, in turn, from the traffic class configurations, which includes information about the overflow relationships. This can be accomplished as follows. For each class that is the target of an overflow relationship, a sharing class is allocated as the parent of that class where a directed edge points from the sharing class to the leaf class, but not vice versa. In addition, for each class that refers to the overflow class under discussion, there is a directed edge from each leaf class to the sharing class created for that overflow class. The service curve for the sharing class is a line traversing the origin with slope equal to the sum of the classes that point to the corresponding overflow classes. In addition, there is a directed edge from the root of the class hierarchy to the sharing class and vice versa. Finally, for each class that is not an overflow class for any other class, there is a directed edge from the root to that class and vice versa. This completes the construction of the internal nodes of the sharing class. When operated upon by the process described above, the desired link sharing outcome is obtained.

While it is presumed herein that the service curve framework applies to traffic aggregates often called a traffic classes, this terminology is adopted for the purposes of exposition and is not meant to limit the scope of this disclosure as it should be obvious to one of ordinary skill in the art upon reading this disclosure that service curves could be applied to any subset or stream of network traffic including, for example, individual transport connections, application sessions, network flows, and so forth, as well as any combination thereof.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method for configuring service curves for managing the output port of a networking device, the method comprising:
    defining a plurality of traffic classes each traffic class being characterized by a bandwidth and a delay priority; and
    computing a plurality of traffic service curves each associated with a different one of the plurality of traffic classes, at least one of the plurality of traffic service curves being characterized by a shifted two-piece linear function shifted such that the service curve limits service to during a nonzero time period prior to the start of the two-piece linear function.

2. The method of claim 1 wherein each traffic class is further characterized by a burst parameter, wherein the burst parameter for a traffic class defines an amount of time the traffic class is allowed to pre-empt traffic classes having lower delay priorities.

3. The method of claim 2 further comprising:
    unshifting each of the shifted two-piece linear functions.

4. The method of claim 3 further comprising:
    displaying a screen to a user via a user interface; and
    receiving data representative of the bandwidth, the delay priority and a name associated with each traffic class from the user.

5. The method of claim 4 further comprising:
    generating the delay priority associated with a class in accordance with the burst parameter defined for the class.

6. The method of claim 5 wherein said burst parameter is defined in units of time.

7. The method of claim 5 wherein said burst parameter is defined in units of packets.

8. The method of claim 4 further comprising:
    configuring a link sharing policy for each traffic class independently from the service curve associated with each traffic class.

9. The method of claim 8 further comprising:
    receiving data representative of the link sharing policy for a traffic class from the user via the user interface; and
    configuring the link sharing policy for the traffic class in accordance with the link sharing policy data.

10. The method of claim 4 further comprising:
    assigning an overflow traffic class to a first one of the plurality of traffic classes; and
    providing the overflow traffic class with a highest priority to use excess bandwidth not used by the first one of the plurality of traffic classes.

11. A service curve mapper comprising:
    a first module adapted to define a plurality of traffic classes each traffic class being characterized by a bandwidth and a delay priority; and
    a second module adapted to compute a plurality of traffic service curves each associated with a different one of the plurality of traffic classes, at least one of the plurality of traffic service curves being characterized by a shifted two-piece linear function shifted such that the service curve limits service to during a nonzero time period prior to the start of the two-piece linear function.

12. The service curve mapper of claim 11 wherein each traffic class is further characterized by a burst parameter, wherein the burst parameter for a traffic class defines an amount of time the traffic class is allowed to pre-empt traffic classes having lower delay priorities.

13. The service curve mapper of claim 12 further comprising:
a third module adapted to unshift each of the shifted two-piece linear functions.

14. The service curve mapper of claim 13 further comprising:
a user interface adapted to display a screen to a user, and to receive data representative of the bandwidth, the delay priority and a name associated with each traffic class from the user.

15. The service curve mapper of claim 14 further comprising:
a module adapted to generate the delay priority associated with a class in accordance with the burst parameter defined for the class.

16. The service curve mapper of claim 15 wherein said burst parameter is defined in units of time.

17. The service curve mapper of claim 15 wherein said burst parameter is defined in units of packets.

18. The service curve mapper of claim 14 further comprising:
a module adapted to configure a link sharing policy for each traffic class independently from the service curve associated with each traffic class.

19. The service curve mapper of claim 18 wherein said user interface is further adapted to receive data representative of the link sharing policy for a traffic; the service curve mapper further comprising:
a module adapted to configure the link sharing policy for the traffic class in accordance with the link sharing policy data.

20. The service curve mapper of claim 13 further comprising:
a module adapted to assign an overflow traffic class to a first one of the plurality of traffic classes; and
a module adapted to provide the overflow traffic class with a highest priority to use excess bandwidth not used by the first one of the plurality of traffic classes.

21. The service curve mapper of claim 13 wherein said first, second and third modules are software modules.

22. The service curve mapper of claim 13 wherein said first, second and third modules are hardware modules.

23. The service curve mapper of claim 13 wherein said first, second and third modules include hot software and hardware modules.

* * * * *